United States Patent [19]
Frederick, Jr.

[11] 3,880,028
[45] Apr. 29, 1975

[54] METHOD AND APPARATUS FOR MONITORING AND CONTROLLING GLASS CUTTING
[75] Inventor: Walter Frederick, Jr., Cumberland, Md.
[73] Assignee: PPG Industries, Inc., Pittsburgh, Pa.
[22] Filed: Feb. 25, 1974
[21] Appl. No.: 445,697

[52] U.S. Cl. .................. 83/7; 83/6; 83/8; 83/74; 83/522
[51] Int. Cl. ............. B26d 3/08; C03b 33/02
[58] Field of Search ........... 83/7, 6, 8, 74, 522; 408/9, 10, 11

[56] References Cited
UNITED STATES PATENTS
3,581,615  6/1971  Kaneshige et al. ............ 83/6 X
3,801,089  4/1974  Fukugami et al. ............ 83/74
3,807,261  4/1974  Couvreur ................... 83/6

Primary Examiner—Frank T. Yost
Attorney, Agent, or Firm—Dennis G. Millman

[57] ABSTRACT

Sound waves, either sonic or ultrasonic, produced by the scoring of glass in a cutting operation, are detected and correlated to the quality of the cut. Pressure on the scoring tool and scoring speed may be controlled in accordance with the detected sound level. Quality of anneal may also be correlated to the sound level.

17 Claims, 2 Drawing Figures

METHOD AND APPARATUS FOR MONITORING AND CONTROLLING GLASS CUTTING

BACKGROUND OF THE INVENTION

This invention relates to a method and apparatus for controlling the quality of cut glass edges and for detecting the profile of the anneal of pieces of glass. More particularly, the invention involves measuring the intensity of sound waves, both sonic and ultrasonic, emitted during the scoring of a piece of glass and correlating that measurement either to the quality of the ensuing cut edge or to the anneal profile along the line of cut.

The quality of the cut edge obtained in a glass cutting operation depends in large measure upon the manner in which the glass is scored. In order to obtain a good score several parameters, such as sharpness of the scoring tool, the amount of pressure applied to the scoring tool, and scoring speed must be carefully controlled. In the past, scoring operations were controlled by trial-and-error techniques whereby scoring was continued until poor cuts were observed, and then adjustments were made. This was, of course, unsatisfactory because adjustments had to be made after the quality of the cuts had already deteriorated, because monitoring of the cuts depended upon imprecise human visual observations, and because the amount and direction of adjustment needed was not always determinable, which led to over-adjusting that in turn could cause more rapid dulling of the scoring tool. Since any mechanical scoring tool becomes progressively duller during normal use, frequent compensating pressure adjustments are required if maximum effectiveness is to be maintained. Thus, it can be seen that some means for continuously and accurately monitoring the effectiveness of a glass scoring operation and for precisely controlling the amount of pressure applied on the scoring tool are needed. Likewise, it would be advantageous to objectively determine poor scoring speeds.

Sound detectors have been used for applications unrelated to the cutting of glass, such as for detecting leaks and faulty bearings, both of which usually utilize ultrasonic detectors. Another use is shown in U.S. Pat. No. 3,548,648 to Weichbrodt, et al., where the dullness of a metal-cutting tool is detected by sensing the proportion of higher frequencies in the sonic range. U.S. Pat. No. 3,361,225 to Nichols shows yet another variant of sonic testing, where the tapping of a metallic bond is electrically "listened to" for the purpose of determining the integrity of the bond.

It should be noted that the term "sound" as used herein refers to both the sonic and ultrasonic ranges "ultrasonic" meaning frequencies above 20,000 cycles per second (20 kHz) and "sonic" meaning humanly audible frequencies below 20,000 cycles per second.

SUMMARY OF THE INVENTION

This invention provides a method and means for detecting sound waves emitted by the mechanical scoring of glass, whereby the sound energy is picked up and translated into an electrical signal which is a function of the intensity of the sound. The signal may be used to register a visual reading on a meter from which the pressure on the scoring tool may be manually adjusted accordingly, or the signal may be used directly to activate automatic control of the scoring tool pressure. By varying the pressure so as to maintain a predetermined sound level, resulting cuts of uniform quality can be obtained.

It has also been found that as a score is being made, variations in the hardness of the glass along the path of the score are exhibited as fluctuations in the intensity of the sound waves emitted. As a result, the profile of the anneal of the glass can be observed and controlled from the sound level reading.

Furthermore, excessive scoring speeds may be discovered and corrected from observing the evenness of the sound level reading.

The invention will be more fully understood from the following detailed description, taken together with the drawings in which.

DETAILED DESCRIPTION OF THE INVENTION

Figure 1:
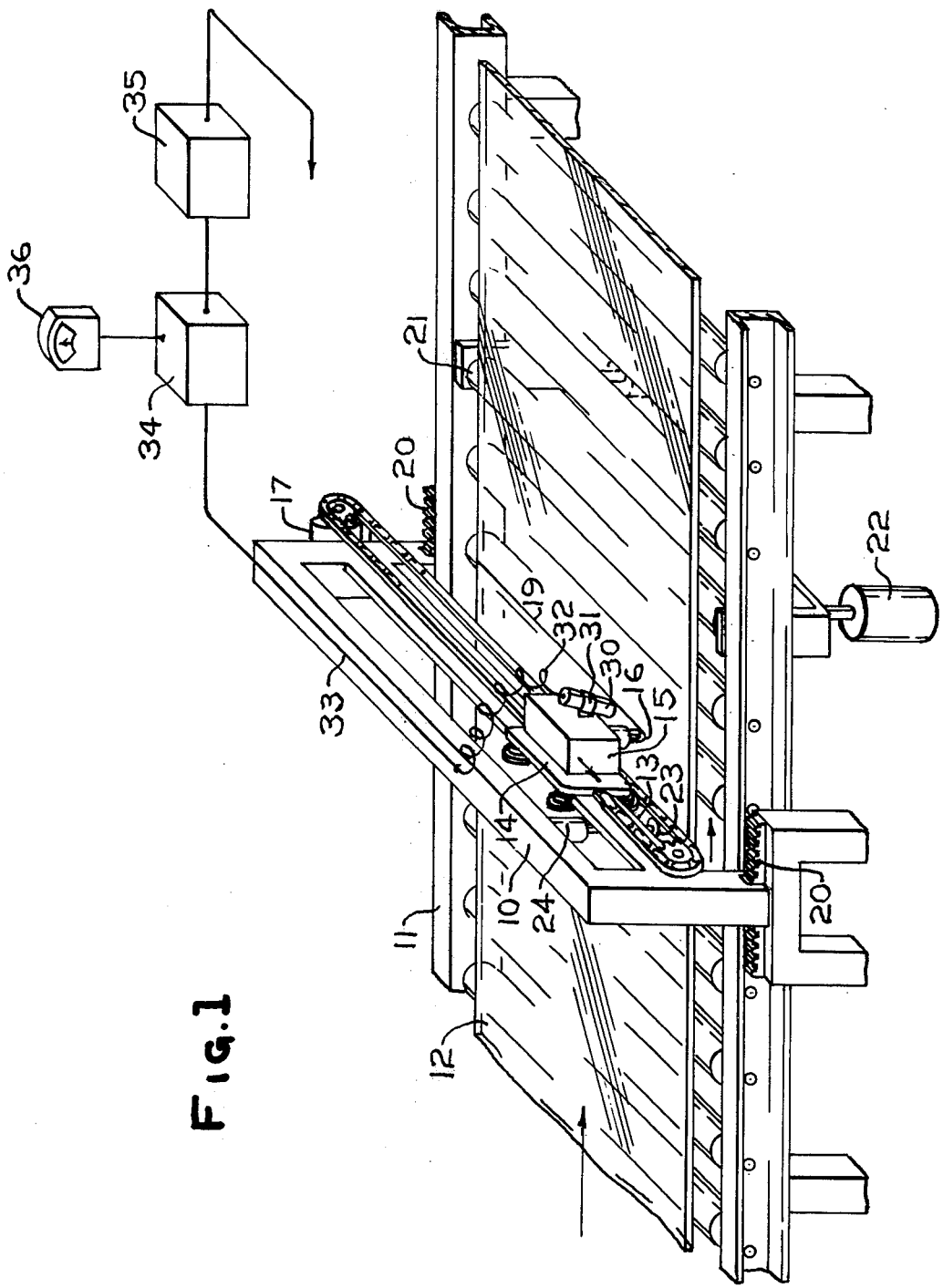
FIG. 1 is a perspective view of a preferred embodiment of the invention.

The figures each depict schematically the cross-cutting station on a continuous ribbon glass-forming line, utilizing a conventional cutter such as the type disclosed in U.S. Pat. No. 3,107,834. A cutting bridge 10 stradles a roller conveyor 11 upon which a ribbon of glass 12 is being carried. The bridge 10 includes a track 13 upon which a cutter head carriage 14 may be propelled, for example, by means of an electric motor 17. Mounted on the carriage 14 is a cutter head assembly 15 which includes conventional mechanical, pneumatic, or electromotive means (not shown) for biasing a rotatably mounted scoring wheel 16 against the upper major surface of the glass as well as vertically moving the scoring wheel into and out of contact with the glass surface. The biasing means are adjustable so as to vary the pressure exerted by the scoring wheel on the glass. Means to carry out the adjustment by remote control may advantageously be included also.

The bridge 10 is provided with a suction cup 23 which is vertically reciprocable by a pneumatic cylinder 24. When the suction cup engages the glass surface, the bridge is advanced at the same speed as the glass while the cutter head traverses the ribbon, thereby making a straight score 19 normal to the longitudinal edge of the ribbon. A rack and pinion arrangement 20 is provided for maintaining the bridge normal to the direction of travel. A snap roll 21, which is vertically translatable, is provided in the conveyor to snap the cuts by raising above the level of the other rolls when a score line in the glass is positioned above it. A pair of hydraulic cylinders 22 beneath the snap roll may be provided to effect the movement of the snap roll.

In FIG. 1, there is shown a preferred embodiment of the present invention whereby a sound pickup device 30 which converts sound waves into electrical energy, such as a microphone or ultrasonic sensor, is mounted on the cutter head 15 with its receiving end closely adjacent the scoring wheel 16. The pickup device is preferably angled toward the scoring wheel with the receiving end as close as possible to the scoring wheel so as to maximize reception of scoring sounds relative to background noise, but the pickup device may be located anywhere in the general vicinity of the scoring operation. The pickup device is held in position by a bracket 31 attached to cutter head 15. A coiled section 32 of an electrical cord 33 provides a flexible electrical connection to the pickup device as it moves with the cutter head. The converted pickup signals are fed via cord 33 to an amplifier 34 where the signals are magnified to greater electrical output signals, which signals are a function of the loudness of the sound received by the pickup device.

The pickup device and amplifier may consist of a conventional audio microphone and amplifying system, but it is preferred that the pickup signal be filtered to a relatively narrow bandwidth of frequencies so as to minimize extraneous background noise and to concentrate on the characteristic frequencies being generated by the particular scoring operation. Extraneous noise can often be reduced further by selecting a bandwidth in the ultrasonic region. It is also highly desirable that the pickup device be directional in its sensitivity to further reduce extraneous noise. A specific example of one commercially available device with which the invention has been successfully practiced is an ultrasonic translator manufactured by the Delcon Division of the Hewlett-Packard Corporation, Mountain View, Calif., designated as model number 4905A. This unit translates frequencies between 36 kHz and 44 kHz into a visual meter reading over a range of 0–100dB, and was provided with a pickup microphone having a 22° directional characteristic.

The output signal may be fed to a controller 35 which includes circuitry for comparing the output signal with a preset reference value and generating an appropriate command signal which is used to control the amount of pressure put on the scoring wheel or the scoring speed. The electronic means involved in such a control loop are all conventional in the machine tool and control arts and need not be described in detail here.

The output signal from the amplifier 34 may be fed to a meter 36 instead of, or in addition to, the controller 35. From a visual readout of the sound level on the meter, an operator may manually adjust the means exerting pressure on the scoring wheel or the scoring speed so as to maintain a predetermined optimum meter reading when the meter alone is used instead of the controller 35.

Figure 2:
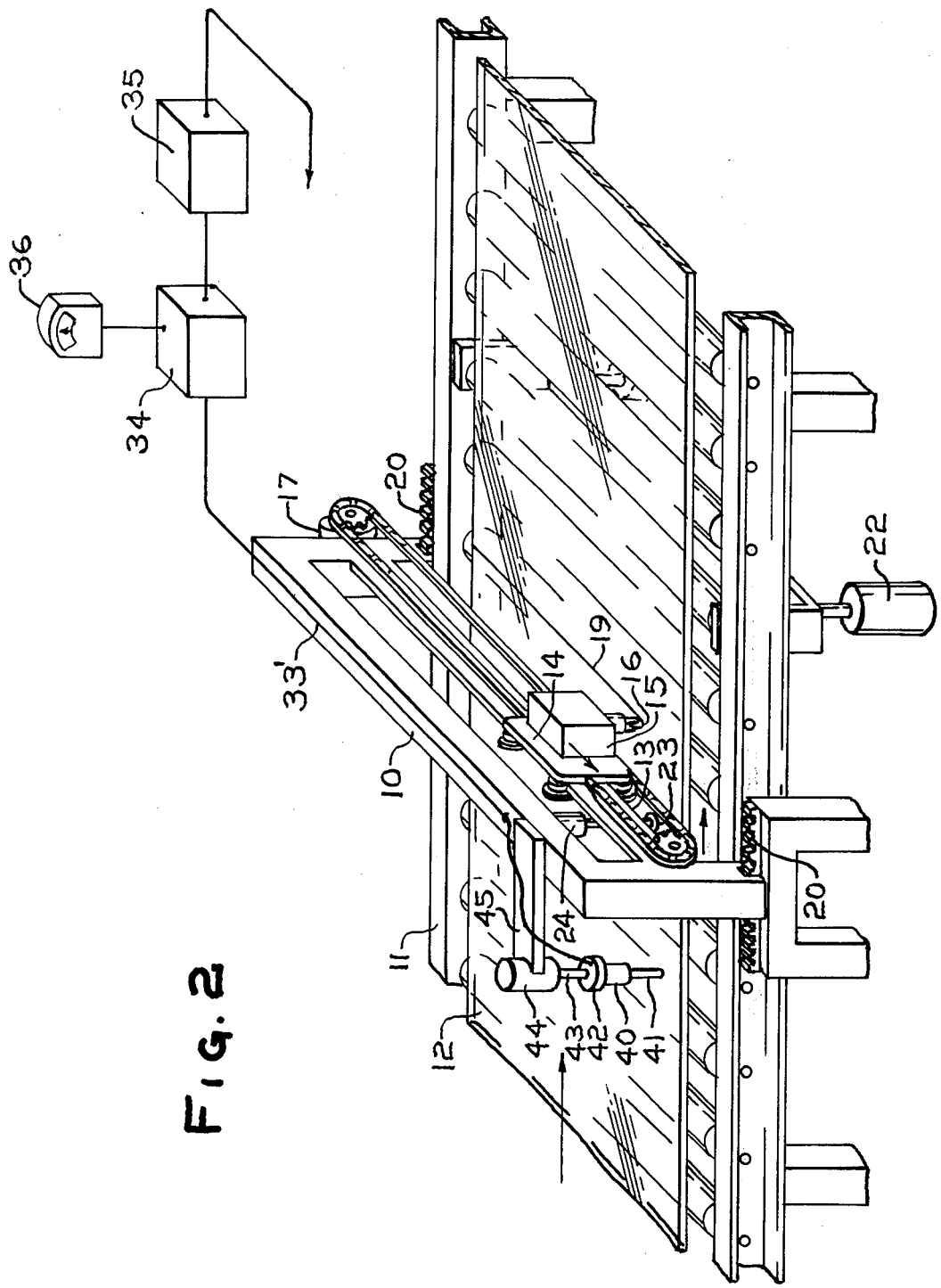
FIG. 2 is a perspective view of an alternate embodiment of the invention.

In FIG. 2, there is shown another embodiment which is the same as that shown in FIG. 1 with the exception of the mounting arrangement for the device and the type of pickup device used. In FIG. 2, a pickup device 40 includes a contact probe 41 which receives sound waves directly from solids with which it is in contact, rather than through the medium of air. Such a probe is provided as an accessory to many commercially available ultrasonic translators such as the Hewlett-Packard instrument described in connection with the FIG. 1 embodiment. With the tip of the probe 41 in contact with the glass 12 at virtually any location thereon, the sound waves produced by the scoring operation may be detected and converted into electrical signals usable for control purposes as set forth above in connection with the FIG. 1 embodiment. A cord 33' provides electrical connection between the pickup device 40, amplifier 34, and controller 35 and/or meter 36, each of which may be the same as its counterpart in the FIG. 1 embodiment. The pickup device 40 is carried by the bridge 10 so that during the scoring operation, it will move with the glass, thereby avoiding scraping between the probe 41 and the glass. Specifically, the pickup device is mounted in a holder 42, which is fastened to the end of a rod 43. Rod 43 is vertically reciprocated by means such as a pneumatic cylinder 44, which is held by an arm 45 extending from bridge 10. The cylinder 44 provides the exertion of a steady pressure by the probe 41 on the glass during the scoring operation, and retracts the probe from contact with the glass during the intervals between scoring operations. The probe 41 could alternatively be held in contact with the glass manually by an operator. Instead of the contact probe 41, the microphone type of pickup device, such as pickup 30 in FIG. 1, may be used in contact with the glass. This is especially useful if the microphone is provided with a resilient, annular shroud around the receiving end, the shroud being in contact with the glass and blocking extraneous sounds.

In the operation of both embodiments, a ribbon of glass 12 passes continuously beneath the bridge 10 until the desired location of a cut lies beneath the scoring tool 16. The cutter heat 15 mechanism then lowers the scoring tool into contact with the glass near an edge thereof, and at the same time, the sound detecting system is activated. The cutter head is propelled along track 13 while bridge 10 moves forward on trolleys 20 until the scoring tool approaches the opposite edge of the glass, at which point the scoring is terminated by retracting the scoring tool from contact with the glass. Thereafter, the sound detector system is deactivated and the cutter head and bridge are returned to their starting positions.

As the scoring tool traverses the width of the glass, producing the score as it goes, the sound pickup device detects the intensity of the characteristic sound waves emitted by the scoring action. In general, higher pressures on the scoring tool are found to produce higher sound level readings. Once an optimum scoring pressure has been determined for a given set of conditions, the corresponding sound level can be maintained constant by adjusting the scoring pressure, thus keeping the scores at the optimum level (assuming that a proper scoring speed is also maintained). When a new scoring wheel is put into operation, its sharpness may result in unnecessarily deep scores at higher pressures, causing chipping of the glass along the score line and, when the cut is snapped open, poor quality cut edges. This will be observed as a high sound level during the scoring. By reducing the pressure on the scoring wheel so as to yield the predetermined optimum sound level, good scores can be quickly obtained without wasteful trial-and-error adjustments. As the scoring wheel becomes duller through use, requiring greater amounts of pressure, the resulting lowered sound levels provide not only an early indication that adjustment is needed before it is manifested in bad cuts, but also the magnitude of change needed, thereby reducing the guesswork and the element of subjective judgment previously required.

If adjustments to the scoring pressure must be made manually (typically by means of an adjusting screw on the cutter head), the adjustments can be made by an operator during the intervals between scores. But when pressure adjustments are made by remote control means, an automatic controller, such as 35, may be utilized, enabling adjustments to be made continuously while a scoring operation is in progress, as well as stepwise during intervals between scores. An operator, reading meter 36, may also make continuous pressure adjustments during the scoring operation via remote control means, but the response would usually be much slower than that of an automatic controller. Accordingly, it would generally be equivalent for the operator to make adjustments step-wise during intervals between scores since changes usually occur very gradually.

The intensity of the sound emitted by the scoring operation also depends upon such factors as the hardness of the glass, the thickness of the glass, and the configuration of the scoring means. The amount of sound actually detected additionally depends upon such factors as the location of the pickup device, the amount of background noise, and the frequency band that is being monitored. Thus, the optimum sound level reading must be empirically determined for each particular installation, and must be re-determined for any major change in conditions.

The sound level meter also provides an indication of proper scoring speed. Speeds which are too rapid are characterized by high readings punctuated by intermittent fluctuations to low levels, as though the scoring tool were skipping. The best cuts are obtained by adjusting the scoring speed so as to maintain steady, intermediate sound levels.

When the sound detector of the present invention is used in conjunction with a cross-cutting operation acting on a ribbon of glass downstream of an annealing lehr, the sound level meter reading can also provide useful information regarding the distribution of annealing effects across the width of the glass. The sound level reading has been found to be a function of the hardness of the glass, so that non-uniformities in the anneal are exhibited as slight fluctuations in the meter reading as the scoring tool traverses the width of the glass, dips indicating harder areas (higher residual stresses) and peaks indicating softer areas (lower residual stresses). From this information, lateral dissymmetry of the temperature in the annealing lehr can be detected and corrected. Changes in temperature conditions in the lehr can be observed by noting the shifting locations of peak readings from cut to cut over longer periods of time. The sound level output signal could also be used in an automatic control system for making corrections in the firing of the annealing lehr. This method may also be used as a test for anneal symmetry on pieces of glass during cutting operations subsequent to the initial cross-cut.

It should be apparent that the present invention is not limited to the cross-cutting of ribbons of glass, to which the specific embodiments described above have been drawn, but is equally applicable to any mechanical glass scoring operation including subdividing sheets, cutting out curved patterns, and cutting non-planar pieces of glass. Although the preferred embodiments have been described with particular reference to the use of scoring wheels, it should also be apparent that the employment of other mechanical scoring means, such as diamond styli, may benefit as well from the use of the present invention. These and other modifications and variations as are known to those of skill in the art may be resorted to without departing from the spirit and scope of the invention as defined by the appended claims.

I claim:

1. A glass scoring apparatus comprising:
    support means for holding a piece of glass in a scoring position;
    a scoring tool mounted to contact said piece of glass in the scoring position;
    means for providing relative motion between said glass and said scoring tool so as to effect scoring of said glass; and
    sound pickup means sensitive to sound waves created by said scoring, said sound pickup means producing an electric signal as a function of the intensity of said sound waves.

2. The apparatus of claim 1, additionally comprising:
    means for converting said electric signal into a visual readout.

3. The apparatus of claim 1, additionally comprising:
    adjusting means for varying the amount of pressure exerted by said scoring tool onto said glass; and
    automatic control means for converting said electric signal into a command for actuating said adjusting means.

4. The apparatus of claim 1 wherein said sound pickup means is mounted closely adjacent to said scoring tool so as to remain stationary relative thereto during the scoring.

5. The apparatus of claim 1 wherein said sound pickup means includes a contact probe mounted so as to contact said glass in said scoring position and to remain stationary relative thereto during the scoring.

6. The apparatus of claim 1 wherein said sound pickup means has associated therewith means for restricting its sensitivity to a limited bandwidth of frequencies in the ultrasonic range.

7. The apparatus of claim 1 wherein said sound pickup means has associated therewith means for restricting its sensitivity to a limited bandwidth of frequencies in the sonic range.

8. In a method of scoring glass whereby a scoring tool is pressed into a surface of a piece of glass while relative motion is provided therebetween, the improvement comprising:
    detecting the sound waves created by the scoring of the glass so as to generate an electric signal as a function of the intensity of said sound waves; and
    utilizing said electric signal as the basis for controlling the amount of pressure exerted by said scoring tool into said piece of glass during the scoring.

9. The method of claim 8 wherein the detection of sound waves is restricted to a limited bandwidth of frequencies in the ultrasonic range.

10. The method of claim 8 wherein the detection of sound waves is restricted to a limited bandwidth of frequencies in the sonic range.

11. The method of claim 8 wherein said electric signal is utilized by an automatic controller to generate a command signal, which in turn actuates pressure adjusting means acting on said scoring tool so as to maintain a predetermined optimum sound intensity.

12. The method of claim 8 wherein said electric signal is utilized to provide a visual readout, and said readout is used to make adjustments in said scoring tool pressure so as to maintain a predetermined optimum sound intensity.

13. In a method of scoring glass whereby a scoring tool is pressed into a surface of a piece of glass while relative motion is provided therebetween, the improvement comprising:
    detecting the sound waves created by the scoring of the glass so as to generate an electric signal as a function of the intensity of said sound waves; and
    utilizing said electric signal as the basis for controlling the speed of said relative motion.

14. The method of claim 13 wherein the detection of sound waves is restricted to a limited bandwidth of frequencies in the ultransonic range.

15. The method of claim 13 wherein the detection of sound waves is restricted to a limited bandwidth of frequencies in the sonic range.

16. The method of claim 13 wherein said electric signal is utilized to provide a visual readout, and said readout is used to make adjustments to the speed of said relative motion so as to maintain the sound intensity level free from abrupt fluctuations.

17. The method of claim 13 wherein said electric signal is utilized by automatic control means to control the speed of said relative motion so as to maintain the sound intensity free from abrupt fluctuations.

* * * * *